United States Patent
Ito

(10) Patent No.: US 8,582,210 B2
(45) Date of Patent: Nov. 12, 2013

(54) LENS AND METHOD FOR PRODUCING LENS

(75) Inventor: Toshiki Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 13/077,759

(22) Filed: Mar. 31, 2011

(65) Prior Publication Data

US 2011/0242672 A1    Oct. 6, 2011

(30) Foreign Application Priority Data

Apr. 2, 2010   (JP) ................................. 2010-086188

(51) Int. Cl.
*G02B 9/00*    (2006.01)

(52) U.S. Cl.
USPC .......................................... 359/642; 359/652

(58) Field of Classification Search
USPC ................................ 359/652–655
See application file for complete search history.

(56) References Cited

U.S. PATENT DOCUMENTS

| | | | |
|---|---|---|---|
| 5,807,906 A | | 9/1998 | Bonvallot |
| 6,236,493 B1* | | 5/2001 | Schmidt et al. ............... 359/296 |
| 7,390,532 B2* | | 6/2008 | Dellwo et al. ................. 427/162 |
| 2003/0174994 A1* | | 9/2003 | Garito et al. .................. 385/129 |
| 2005/0170192 A1* | | 8/2005 | Kambe et al. ................. 428/447 |
| 2006/0052547 A1 | | 3/2006 | Jethmalani et al. |
| 2008/0081264 A1* | | 4/2008 | Mennig et al. ................. 430/2 |
| 2008/0200582 A1 | | 8/2008 | Craciun et al. |
| 2010/0214663 A1* | | 8/2010 | Yoshioka et al. ............. 359/642 |
| 2011/0242631 A1* | | 10/2011 | de Oliveira et al. ............ 359/19 |

FOREIGN PATENT DOCUMENTS

| | | |
|---|---|---|
| CN | 1091522 C | 9/2002 |
| CN | 1760701 A | 4/2006 |
| CN | 1828338 A | 9/2006 |
| CN | 101069109 A | 11/2007 |
| DE | 10 2008 064 168 * | 6/2010 |
| JP | 59-071830 | 4/1984 |
| JP | 61-073101 | 4/1986 |
| JP | 8-244130 A | 9/1996 |
| WO | 2009/044037 A1 | 4/2009 |

OTHER PUBLICATIONS

Koike et al., Plastic axial gradient-index lens, Applied Optics, Dec. 15, 1985, vol. 24, No. 24, pp. 4321-4325.

P.W., Oliveira et al., Electrically induced concentration profiles of nanoparticles in a MMA-Silane matrix: A New method to obtain GRIN-lenses. SPIE, vol. 3136, 0277-786X/97.

* cited by examiner

*Primary Examiner* — Jordan Schwartz

(74) *Attorney, Agent, or Firm* — Canon U.S.A., Inc., IP Division

(57) ABSTRACT

A lens includes a transparent member, wherein the transparent member contains a plurality of polymers formed from organic monomers; the transparent member has a refractive index distribution due to the plurality of polymers; and particles having a lower thermal expansion coefficient than the transparent member are dispersed in the transparent member.

7 Claims, 6 Drawing Sheets

LENS AND METHOD FOR PRODUCING LENS

BACKGROUND OF THE INVENTION

1. Field of the Invention

The present invention relates to a lens and a method for producing such a lens.

2. Description of the Related Art

To correct chromatic aberration in optical systems such as cameras, a plurality of lenses have been used. In particular, optical systems used under white light sources require a large number of lenses for correcting chromatic aberration. However, when chromatic aberration is corrected with a radial gradient index lens having a refractive index distribution in the radial direction with respect to the optical axis, the number of lenses for correcting chromatic aberration can be decreased and the size of zoom lenses can be reduced.

There is a lens having a refractive index distribution in which the lens is composed of polymers formed from two organic monomers having different refractive indices and the refractive index distribution is formed by a three-dimensional distribution of the concentration proportions of the polymers (Japanese Patent Laid-Open No. 8-244130).

Variation in the performance of optical devices such as lenses according to change in the environment such as temperature change is desirably small. In particular, variation in the shape of lenses causes variation in the focal length, which is problematic. In general, an indicator of variation in the shape of a material according to temperature change is a thermal expansion coefficient (ppm/K). Optical devices such as lenses desirably have a low thermal expansion coefficient.

The lens having a refractive index distribution in Japanese Patent Laid-Open No. 8-244130 is formed from organic monomers and hence has a high thermal expansion coefficient.

SUMMARY OF THE INVENTION

The present invention provides a lens having a refractive index distribution and a low thermal expansion coefficient.

A lens according to an aspect of the present invention includes a transparent member, wherein the transparent member contains a plurality of polymers formed from organic monomers and has a refractive index distribution due to the plurality of polymers, and particles having a lower thermal expansion coefficient than the transparent member are dispersed in the transparent member.

A lens according to another aspect of the present invention includes a transparent member, wherein the transparent member contains two or more homopolymers formed from organic monomers having different refractive indices and/or a copolymer formed from two or more organic monomers having different refractive indices; a three-dimensional distribution of composition proportions of the homopolymers and/or copolymerization composition proportions of the copolymer forms a refractive index distribution of the transparent member; particles having a lower thermal expansion coefficient than the transparent member are dispersed in the transparent member; and a volume concentration of the particles in a region of the lens is within ±10% of an average volume concentration of the particles in the lens.

A method for producing a lens according to another aspect of the present invention includes a step of charging a first radiation polymerizable composition containing a first organic monomer that is polymerizable with radiation, a radiation-sensitive polymerization initiator, and particles into a casting cell having an irradiation surface; a step of radiating radiation onto the irradiation surface of the casting cell to polymerize a portion of the first radiation polymerizable composition to provide a polymer of the first composition; a step of removing an unpolymerized portion of the first radiation polymerizable composition from the casting cell; a step of charging a second radiation polymerizable composition containing a second organic monomer that is polymerizable with radiation and has a refractive index different from a refractive index of the first organic monomer, into a cavity generated in the casting cell in the removal step to bring the second radiation polymerizable composition into contact with the first-composition polymer; a step of diffusing the second radiation polymerizable composition into the first-composition polymer; and a step of curing the second radiation polymerizable composition having been diffused into the first-composition polymer and the first-composition polymer in the casting cell.

The present invention can provide a lens having a refractive index distribution and a low thermal expansion coefficient.

Further features of the present invention will become apparent from the following description of exemplary embodiments with reference to the attached drawings.

DESCRIPTION OF THE EMBODIMENTS

First Embodiment

Figure 1:
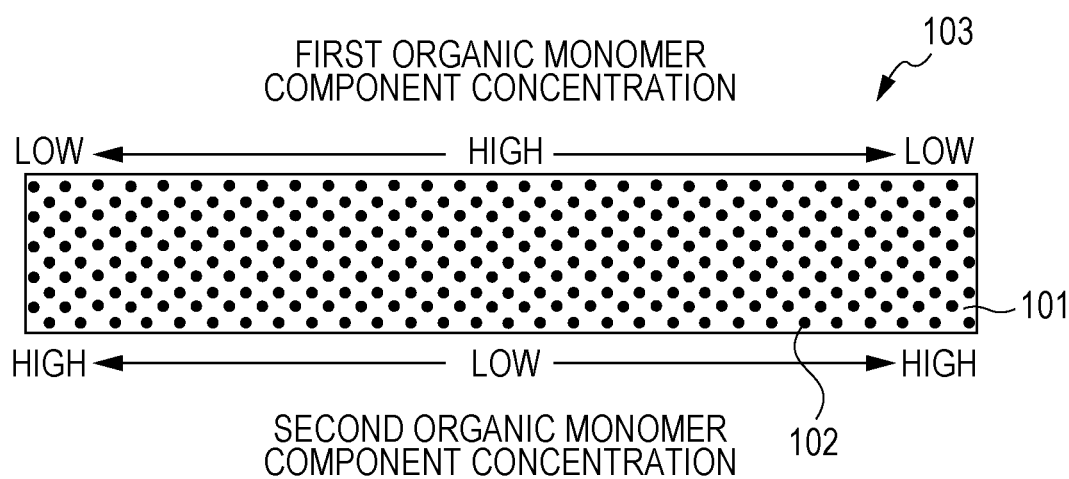
FIG. 1 is a schematic sectional view of a lens according to a first embodiment.

A lens according to a first embodiment of the present invention includes a transparent member wherein the transparent member contains a plurality of polymers formed from organic monomers and has a refractive index distribution due to the plurality of polymers, and particles having a lower thermal expansion coefficient than the transparent member are dispersed in the transparent member. Since the particles having a lower thermal expansion coefficient than the transparent member are dispersed in the transparent member, the lens has a lower thermal expansion coefficient than the transparent member. Accordingly, such a lens deforms to a small degree even when being heated.

In a lens according to the first embodiment, the volume concentration of the particles in a region of the lens is desirably within ±10% of the average volume concentration of the particles in the lens. In such a condition is satisfied, variation in the concentration of the particles in the lens is small and hence variation in the thermal expansion coefficient in the lens is small. Accordingly, when the lens is heated, the difference in deformation in portions of the lens is small. In the first embodiment, the term "region" denotes, for example, a region having dimensions of 0.2 mm×0.2 mm×0.2 mm; and the term "volume concentration of the particles" denotes the volume percentage of the particles in such a region. In the case of a disc-shaped lens having a diameter of 20 mm, preferably 10 or more regions, more preferably 50 or more regions, are measured in terms of volume concentration of the particles and variation in the volume concentration with respect to the average volume concentration of the particles is calculated. Such regions are desirably selected from an area ranging from the central portion to the circumferential portion of the lens. The area of the lens in which the volume concentration of the particles is measured desirably ranges from the center of the lens to a position of the lens corresponding to the effective radius of the lens. The term "effective radius of the lens" denotes, for example, when the volume concentration of the particles is measured linearly from the center to the circumferential portion of the lens and the measured value of the volume concentration at the (n+1)th position is 10% or more larger or 10% or more smaller than that at the n-th position, the distance from the center of the lens to the n-th position.

The plurality of polymers formed from organic monomers in the first embodiment may be a plurality of homopolymers, a plurality of copolymers, a combination of a single homopolymer and a single copolymer, a combination of a plurality of homopolymers and a single copolymer, or a combination of a single homopolymer and a plurality of copolymers.

A transparent member according to the first embodiment, when the entire weight thereof is represented as 100 wt %, contains 30 wt % or more of the plurality of polymers. The transparent member preferably contains 90 wt % or more of the plurality of polymers and, more preferably, 99 wt % or more of the plurality of polymers.

A transparent member according to the first embodiment has a refractive index distribution due to the plurality of polymers formed from organic monomers. The refractive index distribution may be formed in any manner. For example, the refractive index distribution may be formed with a plurality of homopolymers in which the composition proportions of the homopolymers are distributed, or the refractive index distribution may be formed with a copolymer in which the copolymerization composition proportions of the copolymer are distributed.

For example, a lens according to the first embodiment includes a transparent member containing two or more homopolymers formed from organic monomers having different refractive indices and/or a copolymer formed from two or more organic monomers having different refractive indices. Herein, the term "transparent member containing" means that the transparent member contains 30 wt % or more of the homopolymers and/or the copolymer. The transparent member preferably contains 90 wt % or more of the homopolymers and/or the copolymer and more preferably 99 wt % or more of the homopolymers and/or the copolymer. The transparent member has a refractive index distribution due to the three-dimensional distribution of the composition proportions of the homopolymers and/or the copolymerization composition proportions of the copolymer. Herein, "transparent member has a refractive index distribution" means that the transparent member has a variation in refractive index: specifically, a refractive index in a position is different from a refractive index in another position; and encompasses cases where the transparent member has a gradient of refractive index. When a lens has the shape of a cylinder, such a gradient of refractive index may be present in the radial direction of the lens or in the height direction of the lens.

The first embodiment will be described in detail with reference to FIG. 1. FIG. 1 is a schematic sectional view of a lens according to the first embodiment. The rectangle in FIG. 1 is a schematic section of a lens 103 having the shape of a flat plate, the section being taken in the thickness direction of the lens 103. Accordingly, the central portion of the rectangle in FIG. 1 represents the central portion of the lens 103; and the short sides of the rectangle represent the rim of the lens 103.

A lens according to the first embodiment includes a transparent member 101 containing a polymer (hereafter, referred to as a "first polymer") formed from a first organic monomer and a polymer (hereafter, referred to as a "second polymer") formed from a second organic monomer, the first organic monomer and the second organic monomer having different refractive indices.

The central portion of the lens 103 has a high component concentration of the first organic monomer and a low component concentration of the second organic monomer. Toward the rim of the lens 103, the component concentration of the first organic monomer decreases and the component concentration of the second organic monomer increases. That is, a lens according to the first embodiment has a three-dimensional distribution of the component concentration proportions (concentration proportions) of the first organic monomer and the second organic monomer and hence has a refractive index distribution. In the specification and the present invention, the term "component concentration" denotes the weight concentration of an organic monomer in a transparent member in which the organic monomer has been polymerized. For example, when a transparent member is composed of the first polymer and the second polymer, the weight concentration of the first polymer is the component concentration of the first organic monomer. Alternatively, when a transparent member is composed of a copolymer formed from the first organic monomer and the second organic monomer, the quotient calculated by dividing the weight of the component derived from the first organic monomer in the copolymer (excluding a portion of the first organic monomer, the portion being dissociated from the first organic monomer in the polymerization) by the weight of the transparent member is the component concentration of the first organic monomer.

Due to the three-dimensional distribution of the component concentration proportions of the first organic monomer and the second organic monomer, the lens has a composition proportion distribution of the first polymer and the second polymer or a copolymerization composition proportion distribution of a copolymer formed from the first organic monomer and the second organic monomer.

The transparent member may be composed of a copolymer formed from three or more organic monomers. In this case, at least two of these organic monomers forming the copolymer have different refractive indices. The transparent member may contain two or more copolymers. Such a copolymer may be a random copolymer or a block copolymer.

Alternatively, the transparent member may be composed of three homopolymers of organic monomers. In this case, at least two of these homopolymers have different refractive indices. Alternatively, the transparent member may be composed of copolymers and homopolymers.

For example, when the transparent member is composed of polymers formed from four organic monomers, the transparent member may be composed of a copolymer formed from the four organic monomers, a copolymer formed from three organic monomers selected from the four organic monomers, a copolymer formed from two organic monomers selected from the four organic monomers, and homopolymers formed from the four organic monomers.

As illustrated in FIG. 1, particles 102 are uniformly dispersed in the transparent member 101 in a lens according to the first embodiment. The particles 102 have a lower thermal expansion coefficient than the transparent member 101. Accordingly, the lens according to the first embodiment has a lower thermal expansion coefficient than the transparent member.

As described below, such uniform dispersion of particles results in a small variation in thermal expansion coefficients in the lens. For example, consider a flat lens composed of a polymer A (thermal expansion coefficient: X) and a polymer B (thermal expansion coefficient: Y (Y<X)). The central portion of the lens is composed of the polymer A. The circumferential portion of the lens is composed of the polymer B. The area between the central portion and the circumferential portion of the lens is composed of a mixture of the polymers A and B. In this case, the central portion of the lens has the thermal expansion coefficient X. The circumferential portion of the lens has the thermal expansion coefficient Y. The area between the central portion and the circumferential portion of the lens probably has a thermal expansion coefficient that is less than X and more than Y. The difference in thermal expansion coefficient between the central portion and the circumferential portion of the lens is "X–Y". In such a case, when particles (thermal expansion coefficient: Z (Z<Y)) are uniformly dispersed in the lens, the thermal expansion coefficients of the central portion and the circumferential portion of the lens are respectively less than X and Y. In addition, the difference in thermal expansion coefficient between the central portion and the circumferential portion of the lens is less than "X–Y". This is probably because particles generally have a thermal expansion coefficient about an order of magnitude smaller than that of a transparent member formed from organic monomers and the thermal expansion coefficient of particles considerably contributes to the thermal expansion coefficient of the lens. As a result, variation in the thermal expansion coefficient of the lens is reduced. Herein, the term "particles are uniformly dispersed" denotes that, for example, the volume concentration of the particles in a region of a lens according to the first embodiment is within ±10% of the average volume concentration of the particles in the lens according to the first embodiment. For example, when the average volume concentration of the particles is 20%, the volume concentration of the particles in a region of the lens is in the range of 18% to 22%. Thus, since the particles are uniformly dispersed in the transparent member, variation in thermal expansion coefficient in the entirety of the lens is small. Herein, the term "region" denotes what is described above. In the first embodiment, the term "lens" denotes an optical device that refracts received light to thereby diverge or converge the light in an intended direction.

Particles

The primary particle size of particles according to the first embodiment is desirably 1 nm or more and 50 nm or less. The reason for this is as follows. When the primary particle size of the particles is 1 nm or more, the particles are less likely to agglomerate and the particles are readily dispersed in a transparent member according to the first embodiment. When the primary particle size of the particles is 50 nm or less, the occurrence of light scattering caused by the particles is reduced and the lens can have a sufficiently high transparency.

Particles according to the first embodiment desirably have a narrow particle size distribution.

Particles according to the first embodiment desirably have a spherical shape.

Non-limiting examples of particles according to the first embodiment include particles composed of titanium oxide ($TiO_2$), titanium hydroxide ($Ti(OH)_4$), zirconium oxide ($ZrO_2$), tantalum oxide ($Ta_2O_5$), aluminum oxide ($Al_2O_3$), niobium oxide ($Nb_2O_5$), tin oxide ($SnO_2$), antimony oxide ($Sb_2O_5$), zinc oxide (ZnO), silicon oxide ($SiO_2$), indium tin oxide (ITO), indium oxide ($In_2O_3$), lanthanum oxide ($La_2O_3$), gadolinium oxide ($Gd_2O_3$), hafnium oxide ($HfO_2$), erbium oxide ($Er_2O_3$), neodymium oxide ($Nd_2O_3$), cerium oxide ($CeO_2$), dysprosium oxide ($Dy_2O_3$), magnesium oxide (MgO), iron oxide ($Fe_2O_3$), iron hydroxide ($Fe(OH)_3$), gallium oxide ($Ga_2O_3$), gallium hydroxide ($Ga(OH)_3$), magnesium aluminate ($MgAl_2O_4$), tellurium oxide ($TeO_2$, $TeO_3$), zinc sulfide (ZnS), diamond (C), potassium titanate phosphate ($KTiOPO_4$), and yttrium oxide ($Y_2O_3$). In the first embodiment, zirconium oxide particles are desirably used because the particles have a good dispersibility in the organic monomers.

The above-listed particles may be used in combination. In the case of using particles in combination, the particles are desirably selected such that the resultant lens can have a high refractive index, a high heat resistance, low light scattering, and the like.

To uniformly disperse particles in a transparent member, the surfaces of the particles are desirably chemically modified in the preparation of the particles. Alternatively, after the particles are prepared, a treatment such as addition of a dispersing agent is desirably performed. As for particles causing photocatalytic reaction such as titanium oxide particles, to suppress decomposition of a transparent member in areas around the particles by the photocatalytic reaction, if necessary, the particles are desirably treated such that, for example, the surfaces of the particles are coated with a silicon compound or the like.

The content of such particles with respect to the entire weight of a lens is preferably 1 wt % or more and 99 wt % or less and, more preferably 1 wt % or more and 70 wt % or less. The reason for this is as follows. When the content is less than 1 wt %, an advantageous effect of reducing thermal expansion coefficient in the present invention is not sufficiently achieved. When the content is more than 70 wt %, a wide composition distribution of two organic monomers is not achieved and the lens has a narrow refractive index distribution.

Organic Monomers

Examples of organic monomers according to the first embodiment include radical polymerizable monomers and cationic polymerizable monomers.

In the specification, the term "(meth)acryloyl group" is a generic name encompassing an acryloyl group and a methacryloyl group. The term "acryloyl group" denotes a group represented by $CH_2=CHCO-$. The term "methacryloyl group" denotes a group represented by $CH_2=C(CH_3)CO-$. The term "(meth)acryl" is a generic name encompassing acryl and methacryl. The term "(meth)acrylate" is a generic name encompassing acrylate and methacrylate. The term "EO" denotes ethylene oxide. The term "EO-modified compound" denotes a compound having an ethylene-oxide-group block structure. The term "PO" denotes propylene oxide. The term "PO-modified compound" denotes a compound having a propylene-oxide-group block structure. The term "EO/PO-modified compound" denotes a compound having both an ethylene-oxide-group block structure and a propylene-oxide-group block structure.

Radical Polymerizable Monomers

Radical polymerizable monomers are desirably compounds each having one or more (meth)acryloyl groups.

Non-limiting examples of the compounds each having a single (meth)acryloyl group include phenoxyethyl (meth) acrylate, phenoxy-2-methylethyl (meth)acrylate, phenoxyethoxyethyl (meth)acrylate, 3-phenoxy-2-hydroxypropyl (meth)acrylate, 2-phenylphenoxyethyl (meth)acrylate, 4-phenylphenoxyethyl (meth)acrylate, 3-(2-phenylphenyl)-2-hydroxypropyl (meth)acrylate, (meth)acrylate of ethylene oxide adduct of p-cumylphenol, 2-bromophenoxyethyl (meth)acrylate, 2,4-dibromophenoxyethyl (meth)acrylate, 2,4,6-tribromophenoxyethyl (meth)acrylate, phenoxy (meth)acrylate modified with several moles of ethylene oxide or propylene oxide, poly(oxyethylene) nonylphenyl ether (meth)acrylate, isobornyl (meth)acrylate, bornyl (meth)acrylate, tricyclodecanyl (meth)acrylate, dicyclopentanyl (meth) acrylate, dicyclopentenyl (meth)acrylate, cyclohexyl (meth) acrylate, 4-butylcyclohexyl (meth)acrylate, acryloyl morpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth) acrylate, isobutyl (meth)acrylate, t-butyl (meth)acrylate, pentyl (meth)acrylate, isoamyl (meth)acrylate, hexyl (meth) acrylate, heptyl (meth)acrylate, octyl (meth)acrylate, isooctyl (meth)acrylate, 2-ethylhexyl (meth)acrylate, nonyl (meth) acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, benzyl (meth)acrylate, tetrahydrofurfuryl (meth)acrylate, butoxyethyl (meth)acrylate, ethoxydiethylene glycol (meth)acrylate, polyethylene glycol mono(meth)acrylate, polypropylene glycol mono(meth)acrylate, methoxyethylene glycol (meth)acrylate, ethoxyethyl (meth)acrylate, methoxy polyethylene glycol (meth)acrylate, methoxy polypropylene glycol (meth)acrylate, diacetone (meth)acrylamide, isobutoxymethyl (meth) acrylamide, N,N-dimethyl (meth) acrylamide, t-octyl (meth) acrylamide, dimethylaminoethyl (meth) acrylate, diethylaminoethyl (meth)acrylate, 7-amino-3,7-dimethyloctyl (meth)acrylate, N,N-diethyl (meth) acrylamide, and N,N-dimethylaminopropyl (meth) acrylamide.

Non-limiting examples of commercially available compounds each having a single (meth)acryloyl group include ARONIX M101, M102, M110, M111, M113, M117, M5700, TO-1317, M120, M150, and M156 (manufactured by TOAGOSEI CO., LTD.); LA, IBXA, 2-MTA, HPA, VISCOAT #150, #155, #158, #190, #192, #193, #220, #2000, #2100, and #2150 (manufactured by OSAKA ORGANIC CHEMICAL INDUSTRY LTD.); LIGHT-ACRYLATE BO-A, EC-A, DMP-A, THF-A, HOP-A, HOA-MPE, HOA-MPL, PO-A, P-200A, NP-4EA, NP-8EA, and Epoxy Ester M-600A (manufactured by Kyoeisha Chemical Co., Ltd.); KAYARAD TC110S, R-564, and R-128H (manufactured by Nippon Kayaku Co., Ltd.); NK Ester AMP-10G and AMP-20G (manufactured by Shin Nakamura Chemical Co., Ltd.); FA-511A, 512A, and 513A (manufactured by Hitachi Chemical Company, Ltd.); PHE, CEA, PHE-2, PHE-4, BR-31, BR-31M, and BR-32 (manufactured by DAI-ICHI KOGYO SEIYAKU CO., LTD.); VP (manufactured by BASF Japan Ltd.); and ACMO, DMAA, and DMAPAA (manufactured by KOHJIN Co., Ltd.).

Non-limiting examples of the compounds each having two or more (meth)acryloyl groups include trimethylolpropane di(meth)acrylate, trimethylolpropane tri(meth)acrylate, EO-modified trimethylolpropane tri(meth)acrylate, PO-modified trimethylolpropane tri(meth)acrylate, EO/PO-modified trimethylolpropane tri(meth)acrylate, pentaerythritol tri(meth) acrylate, pentaerythritol tetra(meth)acrylate, ethylene glycol di(meth)acrylate, tetraethylene glycol di(meth)acrylate, polyethylene glycol di(meth)acrylate, polypropylene glycol di(meth)acrylate, 1,4-butanediol di(meth)acrylate, 1,6-hexanediol di(meth)acrylate, neopentyl glycol di(meth)acrylate, tris(2-hydroxyethyl) isocyanurate tri(meth)acrylate, tris (acryloyloxy) isocyanurate, bis(hydroxymethyl) tricyclodecane di(meth)acrylate, dipentaerythritol penta(meth)acrylate, dipentaerythritol hexa(meth)acrylate, EO-modified 2,2-bis(4-((meth)acryloxy) phenyl) propane, PO-modified 2,2-bis(4-((meth)acryloxy) phenyl) propane, and EO/PO-modified 2,2-bis(4-((meth)acryloxy) phenyl) propane.

Non-limiting examples of commercially available compounds each having two or more (meth)acryloyl groups include Yupimer UV SA1002 and SA2007 (manufactured by Mitsubishi Chemical Corporation); VISCOAT #195, #230, #215, #260, #335HP, #295, #300, #360, #700, GPT, and 3PA (manufactured by OSAKA ORGANIC CHEMICAL INDUSTRY LTD.); LIGHT-ACRYLATE 4EG-A, 9EG-A, NP-A, DCP-A, BP-4EA, BP-4PA, TMP-A, PE-3A, PE-4A, and DPE-6A (manufactured by Kyoeisha Chemical Co., Ltd.); KAYARAD PET-30, TMPTA, R-604, DPHA, DPCA-20, -30, -60, -120, HX-620, D-310, and D-330 (manufactured by Nippon Kayaku Co., Ltd.); ARONIX M208, M210, M215, M220, M240, M305, M309, M310, M315, M325, and M400 (manufactured by TOAGOSEI CO., LTD.); and Ripoxy VR-77, VR-60, and VR-90 (manufactured by Showa Highpolymer Co., Ltd.). These radical polymerizable monomers may be used alone or in combination.

Cationic Polymerizable Monomers

Cationic polymerizable monomers are desirably compounds each having one or more vinyl ether groups, epoxy groups, or oxetanyl groups.

Non-limiting examples of the compounds each having a single vinyl ether group include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Non-limiting examples of the compounds each having two or more vinyl ether groups include divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether; and polyfunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide adduct of trimethylolpropane trivinyl ether, propylene oxide adduct of trimethylolpropane trivinyl ether, ethylene oxide adduct of ditrimethylolpropane tetravinyl ether, propylene oxide adduct of ditrimethylolpropane tetravinyl ether, ethylene oxide adduct of pentaerythritol tetravinyl ether, propylene oxide adduct of pentaerythritol tetravinyl ether, ethylene oxide adduct of dipentaerythritol hexavinyl ether, and propylene oxide adduct of dipentaerythritol hexavinyl ether.

Non-limiting examples of the compounds each having a single epoxy group include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monooxide, 1,2-epoxydodecane, epichlorohydrin, 1,2-epoxydecane, styrene oxide, cyclohexene oxide, 3-methacryloyloxymethyl cyclohexene oxide, 3-acryloyloxymethyl cyclohexene oxide, and 3-vinyl cyclohexene oxide.

Non-limiting examples of the compounds each having two or more epoxy groups include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resins, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexane carboxylate, 2-(3,4-epoxycyclohexyl-5,5-spiro-3,4-epoxy)cyclohexane-meth-dioxane, bis(3,4-epoxycyclohexylmethyl) adipate, vinylcyclohexene oxide, 4-vinylepoxycyclohexane, bis(3,4-epoxy-6-methylcyclohexylmethyl) adipate, 3,4-epoxy-6-methylcyclohexyl-3',4'-epoxy-6'-methylcyclohexane carboxylate, methylene bis(3,4-epoxycyclohexane), dicyclopentadiene diepoxide, di(3,4-epoxycyclohexylmethyl) ether of ethylene glycol, ethylene bis(3,4-epoxycyclohexane carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol triglycidyl ether, polypropylene glycol diglycidyl ethers, 1,1,3-tetradecadiene dioxide, limonene dioxide, 1,2,7,8-diepoxyoctane, and 1,2,5,6-diepoxycyclooctane.

Non-limiting examples of the compounds each having a single oxetanyl group include 3-ethyl-3-hydroxymethyloxetane, 3-(meth)allyloxymethyl-3-ethyloxetane, (3-ethyl-3-oxetanaylmethoxy)methylbenzene, 4-fluoro-[1-(3-ethyl-3-oxetanaylmethoxy)methyl]benzene, 4-methoxy-[1-(3-ethyl-3-oxetanaylmethoxy)methyl]benzene, [1-(3-ethyl-3-oxetanaylmethoxy)ethyl]phenyl ether, isobutoxy methyl(3-ethyl-3-oxetanaylmethyl)ether, isobornyl oxyethyl(3-ethyl-3-oxetanaylmethyl)ether, isobornyl (3-ethyl-3-oxetanaylmethyl)ether, 2-ethylhexyl (3-ethyl-3-oxetanaylmethyl)ether, ethyldiethylene glycol (3-ethyl-3-oxetanaylmethyl)ether, dicyclopentadiene (3-ethyl-3-oxetanaylmethyl)ether, dicyclopentenyloxyethyl (3-ethyl-3-oxetanaylmethyl)ether, dicyclopentenyl (3-ethyl-3-oxetanaylmethyl)ether, tetrahydrofurfuryl (3-ethyl-3-oxetanaylmethyl)ether, tetrabromophenyl (3-ethyl-3-oxetanaylmethyl)ether, 2-tetrabromophenoxyethyl (3-ethyl-3-oxetanaylmethyl)ether, tribromophenyl (3-ethyl-3-oxetanaylmethyl)ether, 2-tribromophenoxyethyl (3-ethyl-3-oxetanaylmethyl)ether, 2-hydroxyethyl (3-ethyl-3-oxetanaylmethyl)ether, 2-hydroxypropyl (3-ethyl-3-oxetanaylmethyl)ether, butoxyethyl (3-ethyl-3-oxetanaylmethyl)ether, pentachlorophenyl (3-ethyl-3-oxetanaylmethyl)ether, pentabromophenyl (3-ethyl-3-oxetanaylmethyl)ether, and bornyl (3-ethyl-3-oxetanaylmethyl)ether.

Non-limiting examples of the compounds each having two or more oxetanyl groups include polyfunctional oxetanes such as 3,7-bis(3-oxetanayl)-5-oxa-nonane, 3,3'-(1,3-(2-methylenyl)propanediyl bis(oxymethylene))-bis(3-ethyloxetane), 1,4-bis[(3-ethyl-3-oxetanaylmethoxy)methyl]benzene, 1,2-bis[(3-ethyl-3-oxetanaylmethoxy)methyl]ethane, 1,3-bis[(3-ethyl-3-oxetanaylmethoxy)methyl]propane, ethylene glycol bis(3-ethyl-3-oxetanaylmethyl)ether, dicyclopentenyl bis(3-ethyl-3-oxetanaylmethyl)ether, triethylene glycol bis(3-ethyl-3-oxetanaylmethyl)ether, tetraethylene glycol bis(3-ethyl-3-oxetanaylmethyl)ether, tricyclodecanediyldimethylene (3-ethyl-3-oxetanaylmethyl)ether, trimethylolpropane tris(3-ethyl-3-oxetanaylmethyl)ether, 1,4-bis(3-ethyl-3-oxetanaylmethoxy)butane, 1,6-bis(3-ethyl-3-oxetanaylmethoxy)hexane, pentaerythritol tris(3-ethyl-3-oxetanaylmethyl)ether, pentaerythritol tetrakis(3-ethyl-3-oxetanaylmethyl)ether, polyethylene glycol bis(3-ethyl-3-oxetanaylmethyl)ether, dipentaerythritol hexakis(3-ethyl-3-oxetanaylmethyl)ether, dipentaerythritol pentakis(3-ethyl-3-oxetanaylmethyl)ether, dipentaerythritol tetrakis(3-ethyl-3-oxetanaylmethyl)ether, caprolactone-modified dipentaerythritol hexakis(3-ethyl-3-oxetanaylmethyl)ether, caprolactone-modified dipentaerythritol pentakis(3-ethyl-3-oxetanaylmethyl)ether, ditrimethylolpropane tetrakis(3-ethyl-3-oxetanaylmethyl)ether, EO-modified bisphenol A bis(3-ethyl-3-oxetanaylmethyl)ether, PO-modified bisphenol A bis(3-ethyl-3-oxetanaylmethyl)ether, EO-modified hydrogenated bisphenol A bis(3-ethyl-3-oxetanaylmethyl) ether, PO-modified hydrogenated bisphenol A bis(3-ethyl-3-oxetanaylmethyl)ether, and EO-modified bisphenol F (3-ethyl-3-oxetanaylmethyl)ether.

Second Embodiment

A method for producing a lens according to an embodiment of the present invention will be described as a second embodiment. However, a method for producing a lens according to the present invention is not restricted to the second embodiment.

Production Method

A method for producing a lens according to the second embodiment will be described with reference to FIGS. 2A to 2G. FIGS. 2A to 2G illustrate steps of a method for producing a lens according to the second embodiment.

A casting cell having a surface (irradiation surface) irradiated with radiation is prepared. In the second embodiment, the casting cell is prepared so as to have a gap between two bases 201 at least one of which is transparent to the radiation used by interposing a gasket 202 serving as a spacer between the bases 201.

Step (i)

Figure 2A:
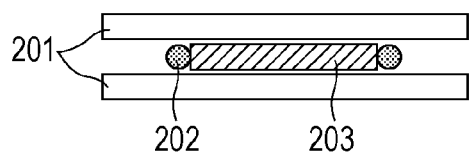
FIGS. 2A to 2G illustrate steps of a method for producing a lens according to a second embodiment.

The gap is filled with a first radiation polymerizable composition (A) 203 containing a first organic monomer (d) that is polymerizable with radiation, a radiation-sensitive polymerization initiator (c), and particles (e) (FIG. 2A).

Step (ii)

Figure 2B:
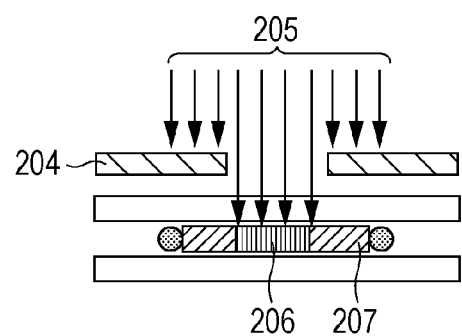

A portion of the irradiation surface the casting cell is subsequently irradiated with radiation 205 through a masking member 204 placed on the irradiation surface. As a result, a portion of the first radiation polymerizable composition (A) 203 in the casting cell is polymerized and turned into a polymer 206 (FIG. 2B). Hereafter, the polymer formed from the first radiation polymerizable composition (A) is sometimes abbreviated as a first-composition polymer. Thus, by polymerizing the first radiation polymerizable composition (A) 203 containing the particles, the first-composition polymer in which the particles are uniformly dispersed can be obtained.

Step (iii)

Figure 2C:
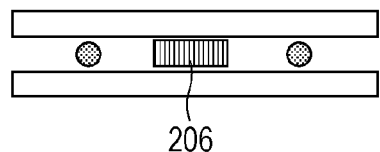

Then, an unpolymerized portion 207 of the first radiation polymerizable composition (A) is removed from the casting cell (FIG. 2C).

Step (iv)

Figure 2D:
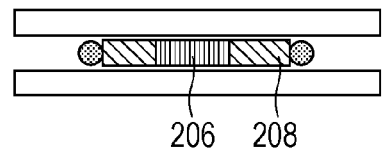

The cavity generated by the removal in the casting cell is subsequently filled with a second radiation polymerizable composition (B) 208 containing a second organic monomer (d1) that is polymerizable with radiation and has a refractive index different from that of the first organic monomer (d). Thus, the second radiation polymerizable composition (B) 208 is brought into contact with the first-composition polymer 206 (FIG. 2D).

Step (v)

Figure 2E:

Then, the casting cell is left for a predetermined time so that the second radiation polymerizable composition (B) 208 diffuses into the first-composition polymer 206 (FIG. 2E).

Step (vi)

Figure 2F:
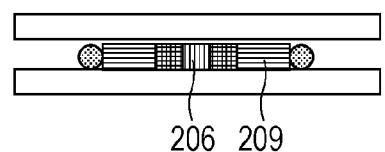

The second radiation polymerizable composition (B) having diffused into the first-composition polymer 206, the first-composition polymer 206, and the second radiation polymerizable composition (B) 208 in the casting cell are subsequently cured by irradiation with radiation or heating (FIG. 2F).

Step (vii)

Figure 2G:

Then, the cured product that is to serve as a lens having a refractive index distribution is removed from the casting cell (FIG. 2G).

For simplicity, in FIGS. 2F and 2G, the cured product is illustrated such that the cured product is constituted by a portion of the first-composition polymer 206 only, a portion of a second-composition polymer 209 formed from the second radiation polymerizable composition (B) only, and a portion that is present between the first-composition polymer 206 and the second-composition polymer 209 and contains both the first-composition polymer 206 and the second-composition polymer 209. There are cases where the portion containing the first-composition polymer 206 and the second-composition polymer 209 has a distribution of the composition proportions of the first-composition polymer 206 and the second-composition polymer 209, which is not illustrated in FIGS. 2F and 2G. When the first organic monomer (d) and the second organic monomer (d1) form a copolymer, there are cases where the copolymer has a distribution of the copolymerization composition proportions. The composition proportions in the distribution and the copolymerization composition proportions in the distribution may vary continuously or discontinuously.

In summary, by a method for producing a lens according to the second embodiment in which such a diffusion phenomenon is employed, a desired lens can be obtained with simple equipment, through a small number of steps, and in a short time. However, a method for producing a lens according to the second embodiment is not restricted to methods employing the diffusion phenomenon.

First Radiation Polymerizable Composition (A)

In the second embodiment, the first radiation polymerizable composition (A) contains the radiation-sensitive polymerization initiator (c), the first organic monomer (d), and the particles (e). The first radiation polymerizable composition (A) may further contain a photosensitizer (f) and a thermal polymerization initiator (g). The particles (e) may be composed of one or more materials selected from the listed materials in the "Particles".

Radiation-sensitive Polymerization Initiator

In the second embodiment, the radiation-sensitive polymerization initiator (c) is a radiation-sensitive radical generator when the first organic monomer (d) is a radical polymerizable monomer; and the radiation-sensitive polymerization initiator (c) is a radiation-sensitive acid generator when the first organic monomer (d) is a cationic polymerizable monomer.

Radiation-sensitive Radical Generator

The radiation-sensitive radical generator is a compound that causes a chemical reaction upon irradiation with a radiation such as infrared rays, visible light, ultraviolet rays, far ultraviolet rays, X rays, or a charged particle beam (e.g., electron beam) and, as a result of the chemical reaction, radicals are generated, which initiates radical polymerization. Non-limiting examples of such a compound include: 2,4,5-triarylimidazole dimers that may be substituted such as a 2-(o-chlorophenyl)-4,5-diphenylimidazole dimer, a 2-(o-chlorophenyl)-4,5-di(methoxyphenyl)imidazole dimer, a 2-(o-fluorophenyl)-4,5-diphenylimidazole dimer, and a 2-(o- or p-methoxyphenyl)-4,5-diphenylimidazole dimer;

benzophenone derivatives such as benzophenone, N,N'-tetramethyl-4,4'-diaminobenzophenone (Michler's ketone), N,N'-tetraethyl-4,4'-diaminobenzophenone, 4-methoxy-4'-dimethylaminobenzophenone, 4-chlorobenzophenone, 4,4'-dimethoxybenzophenone, and 4,4'-diaminobenzophenone;

aromatic ketone derivatives such as 2-benzyl-2-dimethylamino-1-(4-morpholinophenyl)-butanone-1 and 2-methyl-1-[4-(methylthio)phenyl]-2-morpholino-propanone-1-one;

quinones such as 2-ethylanthraquinone, phenanthrenequinone, 2-t-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphthoquinone, 9,10-phenanthrenequinone, 2-methyl-1,4-naphthoquinone, and 2,3-dimethylanthraquinone;

benzoin ether derivatives such as benzoin methyl ether, benzoin ethyl ether, and benzoin phenyl ether;

benzoin derivatives such as benzoin, methylbenzoin, ethylbenzoin, and propylbenzoin;

benzyl derivatives such as benzyl dimethyl ketals;

acridine derivatives such as 9-phenylacridine and 1,7-bis(9,9'-acridinyl)heptane;

N-phenylglycine derivatives such as N-phenylglycine;

acetophenone derivatives such as acetophenone, 3-methylacetophenone, acetophenone benzyl ketal, 1-hydroxy cyclohexyl phenyl ketone, and 2,2-dimethoxy-2-phenylacetophenone;

thioxanthone derivatives such as thioxanthone, diethylthioxanthone, 2-isopropylthioxanthone, and 2-chlorothioxanthone;

xanthone, fluorenone, benzaldehyde, fluorene, anthraquinone, triphenylamine, carbazole, 1-(4-isopropylphenyl)-2-hydroxy-2-methylpropane-1-one, 2-hydroxy-2-methyl-1-phenylpropane-1-one, 2,4,6-trimethylbenzoyldiphenylphosphine oxide, and bis-(2,6-dimethoxybenzoyl)-2,4,4-trimethylpentylphosphine oxide.

Non-limiting examples of commercially available radiation-sensitive radical generators include Irgacure 184, 369, 651, 500, 819, 907, 784, 2959, CGI-1700, -1750, -1850, CG24-61, Darocur 1116, and 1173 (manufactured by Ciba Japan K. K.); Lucirin TPO, LR8893, and LR8970 (manufactured by BASF Japan Ltd.); and EBECRYL P36 (manufactured by UCB S.A.).

These radiation-sensitive radical generators may be used alone or in combination.

Radiation-sensitive Acid Generator

The radiation-sensitive acid generator is a compound that causes a chemical reaction upon irradiation with a radiation such as infrared rays, visible light, ultraviolet rays, far ultraviolet rays, X rays, or a charged particle beam (e.g., electron beam) and, as a result of the chemical reaction, an acid is generated, which initiates cationic polymerization. Non-limiting examples of such a compound include onium salt compounds, sulfone compounds, sulfonate compounds, sulfonimide compounds, and diazomethane compounds. In the second embodiment, onium salt compounds are desirably used as radiation-sensitive acid generators. Non-limiting examples of onium salt compounds include iodonium salts, sulfonium salts, phosphonium salts, diazonium salts, ammonium salts, and pyridinium salts. Specific examples of onium salt compounds include bis(4-t-butylphenyl)iodonium perfluoro-n-butanesulfonate, bis(4-t-butylphenyl)iodonium trifluoromethanesulfonate, bis(4-t-butylphenyl)iodonium 2-trifluoromethylbenzenesulfonate, bis(4-t-butylphenyl)iodonium pyrenesulfonate, bis(4-t-butylphenyl)iodonium n-dodecylbenzenesulfonate, bis(4-t-butylphenyl)iodonium p-toluenesulfonate, bis(4-t-butylphenyl)iodonium benzenesulfonate, bis(4-t-butylphenyl)iodonium 10-camphorsulfonate, bis(4-t-butylphenyl)iodonium n-octanesulfonate, diphenyliodonium perfluoro-n-butanesulfonate, diphenyliodonium trifluoromethanesulfonate, diphenyliodonium 2-trifluoromethylbenzenesulfonate, diphenyliodonium pyrenesulfonate, diphenyliodonium n-dodecylbenzenesulfonate, diphenyliodonium p-toluenesulfonate, diphenyliodonium benzenesulfonate, diphenyliodonium 10-camphorsulfonate, diphenyliodonium n-octanesulfonate, triphenylsulfonium perfluoro-n-butanesulfonate, triphenylsulfonium trifluoromethanesulfonate, triphenylsulfonium 2-trifluoromethylbenzenesulfonate, triphenylsulfonium pyrenesulfonate, triphenylsulfonium n-dodecylbenzenesulfonate, triphenylsulfonium p-toluenesulfonate, triphenylsulfonium benzenesulfonate, triphenylsulfonium 10-camphorsulfonate, triphenylsulfonium n-octanesulfonate, diphenyl(4-t-butylphenyl)sulfonium perfluoro-n-butanesulfonate, diphenyl(4-t-butylphenyl)sulfonium trifluoromethanesulfonate, diphenyl(4-t-butylphenyl)sulfonium 2-trifluoromethylbenzenesulfonate, diphenyl(4-t-butylphenyl)sulfonium pyrenesulfonate, diphenyl(4-t-butylphenyl)sulfonium n-dodecylbenzenesulfonate, diphenyl(4-t-butylphenyl)sulfonium p-toluenesulfonate, diphenyl(4-t-butylphenyl)sulfonium benzenesulfonate, diphenyl(4-t-butylphenyl)sulfonium 10-camphorsulfonate, diphenyl(4-t-butylphenyl)sulfonium n-octanesulfonate, tris(4-methoxyphenyl)sulfonium perfluoro-n-butanesulfonate, tris(4-methoxyphenyl)sulfonium trifluoromethanesulfonate, tris(4-methoxyphenyl)sulfonium 2-trifluoromethylbenzenesulfonate, tris(4-methoxyphenyl)sulfonium pyrenesulfonate, tris(4-methoxyphenyl)sulfonium n-dodecylbenzenesulfonate, tris(4-methoxyphenyl)sulfonium p-toluenesulfonate, tris(4-methoxyphenyl)sulfonium benzenesulfonate, tris(4-methoxyphenyl)sulfonium 10-camphorsulfonate, and tris(4-methoxyphenyl)sulfonium n-octanesulfonate.

Non-limiting examples of sulfone compounds include β-ketosulfone, β-sulfonylsulfone, and α-diazo compounds of β-ketosulfone and β-sulfonylsulfone. Specific examples of sulfone compounds include phenacylphenyl sulfone, mesitylphenacyl sulfone, bis(phenylsulfonyl)methane, and 4-trisphenacyl sulfone.

Non-limiting examples of sulfonate compounds include alkyl sulfonates, haloalkyl sulfonates, aryl sulfonates, and iminosulfonates. Specific examples of sulfonate compounds include α-methylolbenzoin perfluoro-n-butane sulfonate, α-methylolbenzoin trifluoromethane sulfonate, and α-methylolbenzoin 2-trifluoromethylbenzene sulfonate.

Non-limiting examples of sulfonimide compounds include N-(trifluoromethylsulfonyloxy)succinimide, N-(trifluoromethylsulfonyloxy)phthalimide, N-(trifluoromethylsulfonyloxy)diphenylmaleimide, N-(trifluoromethylsulfonyloxy)bicyclo[2.2.1]hept-5-ene-2,3-dicarboxylmide, N-(trifluoromethylsulfonyloxy)-7-oxabicyclo[2.2.1]hept-5-ene-2,3-dicarboxylmide, N-(trifluoromethylsulfonyloxy)bicyclo[2.2.1]heptane-5,6-oxy-2,3-dicarboxylmide, N-(trifluoromethylsulfonyloxy)naphthylimide, N-(10-camphorsulfonyloxy)succinimide, N-(10-camphorsulfonyloxy)phthalimide, N-(10-camphorsulfonyloxy)diphenylmaleimide, N-(10-camphorsulfonyloxy)bicyclo[2.2.1]hept-5-ene-2,3-dicarboxylmide, N-(10-camphorsulfonyloxy)-7-oxabicyclo[2.2.1]hept-5-ene-2,3-dicarboxylmide, N-(10-camphorsulfonyloxy)bicyclo[2.2.1]heptane-5,6-oxy-2,3-dicarboxylmide, N-(10-camphorsulfonyloxy)naphthylimide, N-(4-methylphenylsulfonyloxy)succinimide, N-(4-methylphenylsulfonyloxy)phthalimide, N-(4-methylphenylsulfonyloxy)diphenylmaleimide, N-(4-methylphenylsulfonyloxy)bicyclo[2.2.1]hept-5-ene-2,3-dicarboxylmide, N-(4-methylphenylsulfonyloxy)-7-oxabicyclo[2.2.1]hept-5-ene-2,3-dicarboxylmide, N-(4-methylphenylsulfonyloxy)bicyclo[2.2.1]heptane-5,6-oxy-2,3-dicarboxylmide, N-(4-methylphenylsulfonyloxy)naphthylimide, N-(2-trifluoromethylphenylsulfonyloxy)succinimide, N-(2-trifluoromethylphenylsulfonyloxy)phthalimide, N-(2-trifluoromethylphenylsulfonyloxy)diphenylmaleimide, N-(2-trifluoromethylphenylsulfonyloxy)bicyclo[2.2.1]hept-5-ene-2,3-dicarboxylmide, N-(2-trifluoromethylphenylsulfonyloxy)-7-oxabicyclo[2.2.1]hept-5-ene-2,3-dicarboxylmide, N-(2-trifluoromethylphenylsulfonyloxy)bicyclo[2.2.1]heptane-5,6-oxy-2,3-dicarboxylmide, N-(2-trifluoromethylphenylsulfonyloxy)naphthylimide, N-(4-fluorophenylsulfonyloxy)succinimide, N-(4-fluorophenylsulfonyloxy)phthalimide, N-(4-fluorophenylsulfonyloxy)diphenylmaleimide, N-(4-fluorophenylsulfonyloxy)bicyclo[2.2.1]hept-5-ene-2,3-dicarboxylmide, N-(4-fluorophenylsulfonyloxy)-7-oxabicyclo[2.2.1]hept-5-ene-2,3-dicarboxylmide, N-(4-fluorophenylsulfonyloxy)bicyclo[2.2.1]heptane-5,6-oxy-2,3-dicarboxylmide, and N-(4-fluorophenylsulfonyloxy)naphthylimide.

Non-limiting examples of diazomethane compounds include bis(trifluoromethylsulfonyl)diazomethane, bis(cyclohexylsulfonyl)diazomethane, bis(phenylsulfonyl)diazomethane, bis(p-toluenesulfonyl)diazomethane, methylsulfonyl p-toluenesulfonyl diazomethane, (cyclohexylsulfonyl)(1,1-dimethylethylsulfonyl)diazomethane, and bis(1,1-dimethylethylsulfonyl)diazomethane.

These radiation-sensitive acid generators may be used alone or in combination.

The mixing percentage of the radiation-sensitive polymerization initiator (c) with respect to the entire amount of the first radiation polymerizable composition (A) is preferably 0.01 wt % or more and 10 wt % or less and more preferably 0.1 wt % or more and 3 wt % or less. When the mixing percentage is less than 0.01 wt %, there may be cases where the polymerization rate of the first radiation polymerizable composition (A) is low and the reaction efficiency is low. When the mixing percentage is more than 10 wt %, there may be cases where the cured product of the first radiation polymerizable composition (A) is brittle or the cured product is tinted due to absorption of visible light by the radiation-sensitive acid generator.

In the second embodiment, the particles (e) are desirably chemically modified with a surface modifying agent having a functional group that can polymerize with the first organic monomer (d). This is because, in the diffusion of the second radiation polymerizable composition (B), diffusion of the particles (e) is reduced and uniform dispersion of the particles (e) in a lens according to the second embodiment is maintained. The functional group that can polymerize with the first organic monomer (d) is desirably a (meth)acryloyl group when the first organic monomer (d) is a radical polymerizable monomer. The functional group that can polymerize with the first organic monomer (d) is desirably a vinyl ether group, an epoxy group, or an oxetanyl group when the first organic monomer (d) is a cationic polymerizable monomer.

In the second embodiment, the first radiation polymerizable composition (A) desirably contains the photosensitizer (f). When the first radiation polymerizable composition (A) contains the photosensitizer (f), polymerization can be achieved with less light exposure. The photosensitizer (f) is a compound that is excited by absorbing light having a specific wavelength and interacts with the radiation-sensitive polymerization initiator (c). Non-limiting examples of the photosensitizer (f) include coumarin derivatives, benzophenone derivatives, thioxanthone derivatives, anthracene derivatives, carbazole derivatives, and perylene derivatives. The interaction between the photosensitizer (f) and the radiation-sensitive polymerization initiator (c) is, for example, energy transfer or electron transfer from the photosensitizer (f) being excited to the radiation-sensitive polymerization initiator (c). The photosensitizer (f) desirably has a higher molar extinction coefficient with respect to exposure wavelength than the radiation-sensitive polymerization initiator (c).

Second Radiation Polymerizable Composition (B)

The second radiation polymerizable composition (B) contains the second organic monomer (d1) that is polymerizable with radiation and has a refractive index different from that of the first organic monomer (d). The second radiation polymerizable composition (B) may further contain particles (e1), a photosensitizer (f1), and a thermal polymerization initiator (g1).

The first radiation polymerizable composition (A) and the second radiation polymerizable composition (B) are desirably in the form of liquid. The first radiation polymerizable composition (A) is desirably in the form of liquid when the first radiation polymerizable composition (A) is charged into and removed from a casting cell. This is because the first radiation polymerizable composition (A) can be readily charged into the casting cell and an unpolymerized portion of the first radiation polymerizable composition (A) can be readily removed from the casting cell. When the first radiation polymerizable composition (A) is in the form of liquid, the removal of the unpolymerized portion of the first radiation polymerizable composition (A) from the first-composition polymer is less likely to damage the end surfaces of the polymer.

When the first radiation polymerizable composition (A) is in the form of solid at room temperature under atmospheric pressure, if necessary, the first radiation polymerizable composition (A) may be charged into or removed from a casting cell under heating or pressurization.

Casting Cell

In the second embodiment, the casting cell is prepared so as to have a gap between two bases at least one of which is transparent to the radiation used by interposing a gasket serving as a spacer between the bases. If necessary, the bases of the casting cell may be fixed with spring clips or the like.

The first radiation polymerizable composition (A) is charged into the gap provided with the spacer by using a syringe or the like. Such a transparent base is composed of, for example, quartz; glass; a transparent resin such as a silicone resin, a fluorocarbon resin, an acrylic resin, a polycarbonate resin, or polyimide; sapphire; or diamond. To readily perform the step of removing the first radiation polymerizable composition (A) and the step of bringing the second radiation polymerizable composition (B) into contact with the first-composition polymer, the syringe needle is desirably left so as to be inserted in the casting cell after the first radiation polymerizable composition (A) is charged into the casting cell. The inner surfaces of the casting cell may be spherical surfaces or aspherical surfaces such as flat surfaces and can be selected in accordance with an intended device.

To readily release the cured product of the first radiation polymerizable composition (A) and the second radiation polymerizable composition (B) from the casting cell, the inner surfaces of the casting cell are desirably treated with a release agent. Such a treatment with a release agent is performed by applying the release agent such as a fluorocarbon resin, a silicone resin, or a fatty ester by spraying, dipping, spin-coating, or the like and, if necessary, by heating the applied agent. Excessive release agent on the casting cell may be removed by cleaning with a solvent or wiping.

Radiation

A radiation with which the casting cell is irradiated is selected in accordance with the sensitivity wavelength of the first radiation polymerizable composition (A), and is desirably appropriately selected from ultraviolet rays ranging from about 200 to 400 nm, X rays, electron beams, and the like. Since various photosensitive compounds having sensitivity to ultraviolet rays for the first organic monomer (d) are readily available, a radiation used in the second embodiment is desirably particularly ultraviolet rays. A light source radiating ultraviolet rays is, for example, a high-pressure mercury-vapor lamp, an ultrahigh-pressure mercury-vapor lamp, a low-pressure mercury-vapor lamp, a Deep-UV lamp, a carbon-arc lamp, a chemical lamp, a metal halide lamp, a xenon lamp, or the like. In particular, an ultrahigh-pressure mercury-vapor lamp is desirable. The above-listed radiations may be used in combination.

A radiation is radiated onto the irradiation surface of a casting cell to thereby cure a portion of the first radiation polymerizable composition (A) in the casting cell. A portion of the first radiation polymerizable composition (A) in the casting cell is cured by irradiating the first radiation polymerizable composition (A) with the radiation through a masking member on the irradiation surface of the casting cell, or scanning the portion with the radiation in the form of a beam. The degree of polymerization of the first radiation polymerizable composition (A) can be controlled by adjusting the dose of the radiation.

When a portion of the first radiation polymerizable composition (A) is polymerized, a radiation may be radiated in accordance with a dose distribution. When a radiation is radiated in accordance with a dose distribution, the degree of polymerization of the first radiation polymerizable composition (A) can be controlled and a refractive index distribution can be controlled.

For example, when the dose of a radiation radiated onto the irradiation surface of a casting cell decreases toward the circumference of the irradiation surface, the second radiation polymerizable composition (B) is readily diffused into the circumferential portion of the first-composition polymer, which is desirable.

Alternatively, the dose of a radiation radiated onto the irradiation surface of a casting cell desirably increases toward the circumference of the irradiation surface.

Since the diffusion rate of the second radiation polymerizable composition (B) depends on the viscosity, crosslinking density, or the like of the first-composition polymer, the diffusion behavior of the second radiation polymerizable composition (B) can be controlled by irradiating the first radiation polymerizable composition (A) in accordance with a dose distribution. Thus, a refractive index distribution profile can be controlled.

Non-limiting examples of a method of radiating a radiation in accordance with a dose distribution include a method of placing a gray-scale mask having locally different radiation transmittances on the casting cell, a method of moving a masking member during the irradiation with the radiation, and a method of scanning a target portion with the radiation in the form of a beam.

The degree of polymerization of the first radiation polymerizable composition (A) after radiation polymerization is desirably as less as possible such that, when the unpolymerized portion of the first radiation polymerizable composition (A) in the form of liquid is removed with a syringe needle at the interface between the irradiated portion and the unirradiated portion of the first radiation polymerizable composition (A), the first-composition polymer does not collapse. Similarly, in the removal step of the unpolymerized portion and the injection step of the second radiation polymerizable composition (B) described below, the minimum degree of polymerization with which the shape of the polymer does not collapse is desirable. This is because, the lower the degree of polymerization of the first-composition polymer, the more rapidly the diffusion of the second radiation polymerizable composition (B) proceeds.

The degree of curing of the polymer of the first radiation polymerizable composition (A) formed by irradiation with a radiation will be described.

In the second embodiment, the complex viscosity of the first radiation polymerizable composition (A) is desirably 10 Pa·s or more and less than 10,000 Pa·s. When the complex viscosity is 10 Pa·s or more, when the unpolymerized portion of the first radiation polymerizable composition (A) in the form of liquid is removed with a syringe needle from a casting cell, the irradiated portion of the first radiation polymerizable composition (A), that is, the cured portion is less likely to collapse. When the complex viscosity is less than 10,000 Pa·s, the second radiation polymerizable composition (B) diffuses rapidly in the standing step described below. The complex viscosity of the polymer of the first composition (A) is desirably 50 Pa·s or more and desirably 6,000 Pa·s or less.

The complex viscosity can be measured with a dynamic viscoelasticity measurement apparatus (viscoelasticity measurement apparatus MCR-301 manufactured by Anton Paar Japan K.K.).

To form a gel polymer that does not collapse, the exposure dose of a radiation having a wavelength of 365 nm is preferably 0.01 mJ/cm$^2$ or more and 1,000,000 mJ/cm$^2$ or less and, more preferably 0.1 mJ/cm$^2$ or more and 100,000 mJ/cm$^2$ or less.

The unpolymerized portion of the first radiation polymerizable composition (A) in the unirradiated portion is removed from the casting cell. When a syringe needle used for the injection of the first radiation polymerizable composition (A) is left in the casting cell, the unpolymerized portion of the first radiation polymerizable composition (A) is desirably extracted through the syringe needle. If necessary, the unpolymerized portion of the first radiation polymerizable composition (A) may be removed under heating or pressurization. The unpolymerized portion of the first radiation polymerizable composition (A) being in contact with the end surfaces of the gel is in the form of liquid and hence is less likely to damage the end surfaces of the gel in the removal of the unpolymerized portion of the first radiation polymerizable composition (A).

A syringe containing the second radiation polymerizable composition (B) is attached to the syringe needle. Then, the cavity generated by the removal in the casting cell is filled with the second radiation polymerizable composition (B) that is in the form of liquid and has a refractive index different from that of the first radiation polymerizable composition (A). If necessary, the second radiation polymerizable composition (B) may be injected under heating or pressurization.

After the second radiation polymerizable composition (B) is injected, the casting cell is left to stand for a predetermined time. In this standing step, the second radiation polymerizable composition (B) diffuses into the polymerized portion of the first radiation polymerizable composition (A) to provide a concentration proportion distribution of the compositions (A) and (B). The lower the degree of polymerization of the first-composition polymer, the more rapidly the diffusion proceeds. To accelerate the diffusion, heating, application of an electric field, or application of a magnetic field may be performed or the casting cell may be rotated during the standing step. In the step of diffusing the second radiation polymerizable composition (B) into the first-composition polymer, the casting cell is desirably heated to a temperature higher than room temperature (23° C.)

After the standing step, to terminate the diffusion, the polymerized portion of the first radiation polymerizable composition (A) and the second radiation polymerizable composition (B) are irradiated with a radiation and/or heated to be cured. As the radiation, the above-described radiations may be used. The heating may be performed with an existing apparatus such as an oven or a hot plate. To form a cured product having sufficiently high mechanical physical property and environmental stability, the compositions (A) and (B) are desirably sufficiently cured.

The cured product portion of the first radiation polymerizable composition (A) and the cured product portion of the second radiation polymerizable composition (B) desirably have different refractive index wavelength dispersions.

The cured product is released from the casting cell. Thus, an intended lens having a composition distribution is provided.

EXAMPLES

Hereinafter, the present invention will be described in detail with reference to specific examples.

Symbols used below are summarized as follows.
(A): The First Radiation Polymerizable Composition
  (d): the first organic monomer
  (e): particles
  (c): radiation-sensitive polymerization initiator contained in the first radiation polymerizable composition
(B): The Second Radiation Polymerizable Composition
  (d1): the second organic monomer
  (e1): particles
  (c1): radiation-sensitive polymerization initiator contained in the second radiation polymerizable composition Reference Example 1

In REFERENCE EXAMPLE 1, plastic cured products having model compositions corresponding to the central portion and the circumferential portion of a lens were produced and measured in terms of thermal expansion coefficient.

Hereinafter, an example of producing plastic cured products having model compositions will be described.

A radiation polymerizable composition (A)-1 was prepared that was composed of 75 parts by weight of benzyl methacrylate (manufactured by Kyoeisha Chemical Co., Ltd.) serving as (d), 25 parts by weight of zirconium oxide particles having an average diameter of 7 nm (manufactured by Sumitomo Osaka Cement Co., Ltd.) serving as (e), and 0.1 parts by weight of a photosensitive radical generator (IRGACURE 184 manufactured by Ciba Japan K. K.) serving as (c).

A radiation polymerizable composition (B)-1 was prepared that was composed of 75 parts by weight of methyl methacrylate (manufactured by Sigma-Aldrich Japan K.K.) serving as (d1), 25 parts by weight of zirconium oxide particles having an average diameter of 7 nm (manufactured by Sumitomo Osaka Cement Co., Ltd.) serving as (e), and 0.1 parts by weight of a photosensitive radical generator (IRGACURE 184 manufactured by Ciba Japan K. K.) serving as (c1).

Cured products of benzyl methacrylate (polymer: poly(benzyl methacrylate)) have a refractive index of 1.568. Cured products of methyl methacrylate (polymer: poly(methyl methacrylate)) have a refractive index of 1.490.

Four disc-shaped optical glass plates having a diameter of 70 mm and a thickness of 5 mm were coated with a release agent (DAIFREE Aerosol-type GA-6010, manufactured by DAIKIN INDUSTRIES, LTD.) by spraying. The excessive release agent was wiped from the glass plates with a cleaning cloth for optical devices.

An O-ring that was composed of a fluororubber and had a diameter of 35 mm and a thickness of 2.0 mm was sandwiched between the central portions of two optical glass plates among the four optical glass plates. Then, these two optical glass plates were fixed together with two spring clips so as to face each other. In this way, two casting cells (first and second casting cells) were prepared. The first casting cell was carefully charged with about 1.5 ml of the radiation polymerizable composition (A)-1 with a disposable syringe such that no bubbles were left. The second casting cell was carefully charged with about 1.5 ml of the radiation polymerizable composition (B)-1 with a disposable syringe such that no bubbles were left.

An UV light source EX250 including a 250 W ultrahigh-pressure mercury-vapor lamp (manufactured by HOYA CANDEO OPTRONICS CORPORATION) was used as a radiation light source. A filter that transmits ultraviolet rays and absorbs visible light (UTVAF-50S-36U, manufactured by SIGMA KOKI CO., LTD.) and a frosted dispersion plate (DFSQ1-50C02-800, manufactured by SIGMA KOKI CO., LTD.) were placed between the light source and one of the casting cells. The casting cell was irradiated with a radiation from the light source. An illuminance at a surface of an optical glass plate of the casting cell, the surface being irradiated with the radiation, was 30 mW/cm$^2$ in terms of wavelength of 365 nm.

The front surface of the casting cell charged with the radiation polymerizable composition (A)-1 and the whole surfaces of the casting cell charged with the radiation polymerizable composition (B)-1 were each irradiated with the radiation from the optical system for an hour. Then, the optical glass plates were disassembled and cured products that had the shape of a flat plate and were formed from the radiation polymerizable compositions (A)-1 and (B)-1 were obtained.

The flat-plate cured product composed of a polymer formed from the radiation polymerizable composition (A)-1 and the flat-plate cured product composed of a polymer formed from the radiation polymerizable composition (B)-1 were measured in terms of thermal expansion coefficient in the range of 0° C. to 40° C. with a thermomechanical analyzer Thermo Plus EVO TMA 8310 manufactured by Rigaku Corporation. As a result, the cured product composed of the (A)-1 polymer was found to have a thermal expansion coefficient of 58 ppm/° C.; and the cured product composed of the (B)-1 polymer was found to have a thermal expansion coefficient of 59 ppm/° C.

Reference Example 2

In REFERENCE EXAMPLE 2, plastic cured products having model compositions in which the content of the particles was higher than that in REFERENCE EXAMPLE 1 were produced in the same manner as in REFERENCE EXAMPLE 1 and measured in terms of thermal expansion coefficient.

A radiation polymerizable composition (A)-2 was prepared that was composed of 50 parts by weight of benzyl methacrylate (manufactured by Kyoeisha Chemical Co., Ltd.) serving as (d), 50 parts by weight of zirconium oxide particles having an average diameter of 7 nm (manufactured by Sumitomo Osaka Cement Co., Ltd.) serving as (e), and 0.1 parts by weight of a photosensitive radical generator (IRGACURE 184 manufactured by Ciba Japan K. K.) serving as (c).

A radiation polymerizable composition (B)-2 was prepared that was composed of 50 parts by weight of methyl methacrylate (manufactured by Sigma-Aldrich Japan K.K.) serving as (d1), 50 parts by weight of zirconium oxide particles having an average diameter of 7 nm (manufactured by Sumitomo Osaka Cement Co., Ltd.) serving as (e), and 0.1 parts by weight of a photosensitive radical generator (IRGACURE 184 manufactured by Ciba Japan K. K.) serving as (c1).

Flat-plate cured products formed from the radiation polymerizable compositions (A)-2 and (B)-2 were produced as in REFERENCE EXAMPLE 1.

The flat-plate cured products formed from the radiation polymerizable compositions (A)-2 and (B)-2 were measured in terms of thermal expansion coefficient in the range of 0° C. to 40° C. as in REFERENCE EXAMPLE 1. As a result, the cured product composed of the (A)-2 polymer was found to have a thermal expansion coefficient of 53 ppm/° C.; and the cured product composed of the (B)-2 polymer was found to have a thermal expansion coefficient of 55 ppm/° C.

From REFERENCE EXAMPLES 1 and 2, it has been demonstrated that, when radiation polymerizable compositions have the same weight proportion of the particles (e), difference in thermal expansion coefficient between cured products formed from these compositions is small.

Similarly, a cured product was formed from 100 parts by weight of methyl methacrylate, analyzed, and found to have a thermal expansion coefficient of 75 ppm/° C. As described below, similarly, a cured product was formed from 100 parts by weight of benzyl methacrylate, analyzed, and found to have a thermal expansion coefficient of 71 ppm/° C. Therefore, from REFERENCE EXAMPLES 1 and 2, it has been demonstrated that, by uniformly dispersing particles of zirconium oxide, the thermal expansion coefficient of a cured product is decreased and, in addition, difference in thermal expansion coefficient between cured products having different proportions of a polymer of an organic monomer is also decreased.

Example 1

In EXAMPLE 1, an example of production of a lens according to the present invention will be described.

A radiation polymerizable composition (A)-3 was prepared that was composed of 75 parts by weight of benzyl methacrylate (manufactured by Kyoeisha Chemical Co., Ltd.) serving as (d), 25 parts by weight of zirconium oxide particles having an average diameter of 7 nm (manufactured by Sumitomo Osaka Cement Co., Ltd.) serving as (e), and 0.1 parts by weight of a photosensitive radical generator (IRGACURE 184 manufactured by Ciba Japan K. K.) serving as (c).

A radiation polymerizable composition (B)-3 was prepared that was composed of 72 parts by weight of tetrafluoropropyl methacrylate (manufactured by OSAKA ORGANIC CHEMICAL INDUSTRY LTD.), 18 parts by weight of methyl methacrylate (manufactured by Sigma-Aldrich Japan K.K.), and 10 parts by weight of trimethylolpropane triacrylate that served as (d1), and 0.1 parts by weight of a photosensitive radical generator (IRGACURE 184 manufactured by Ciba Japan K. K.) serving as (c1).

Two disc-shaped optical glass plates as in REFERENCE EXAMPLE 1 were prepared.

A casting cell filled with the radiation polymerizable composition (A)-3 was prepared as in REFERENCE EXAMPLE 1. A 50 mm diameter photomask having a 20 mm diameter circular transparent portion in the central portion thereof was placed as a light-shielding member on the casting cell. The casting cell was exposed for 50 seconds through the photomask with an optical system as in REFERENCE EXAMPLE 1. The light-shielding material of the photomask was chromium and the base material of the photomask was quartz. In terms of light having a wavelength of 365 nm, the transmittance of the light-shielding portion was 0.01% or less and the transmittance of the transparent portion was 98%. As a result of the exposure, a columnar gel having a diameter of 20 mm was formed in the central portion of the casting cell.

An empty disposable syringe was attached to a syringe needle. The uncured portion of the radiation polymerizable composition (A)-3 was extracted from the casting cell with the syringe. Then, a disposable syringe filled with the radiation polymerizable composition (B)-3 was attached to the syringe needle. The radiation polymerizable composition (B)-3 was rapidly injected into the casting cell. The casting cell was left in an oven at 80° C. for 4 hours.

The whole surfaces of the casting cell was irradiated for an hour with a light source and an optical system as in REFERENCE EXAMPLE 1. Then, the optical glass plates were disassembled and a flat-plate cured product was obtained.

Figure 3:
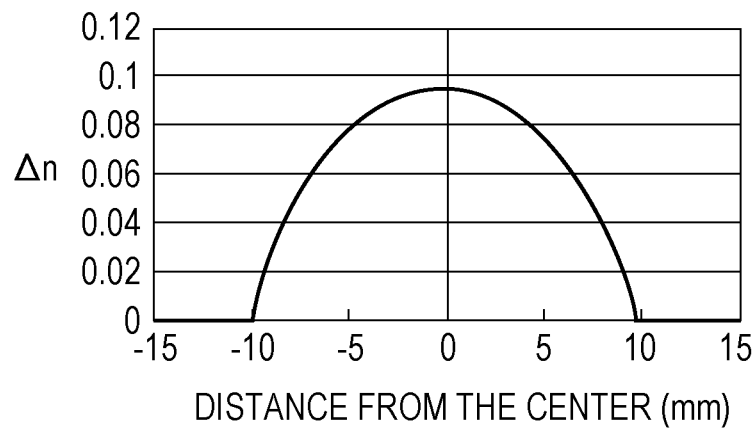
FIG. 3 illustrates a refractive index distribution of a lens obtained in EXAMPLE 1.

The cured product was evaluated in terms of refractive index distribution at a wavelength of 524.3 nm with a ray-tracing refractive-index-distribution measurement apparatus (Index Profile Analyzer: IPA5-C, manufactured by ADVANCED TECHNOLOGIES CO., LTD.). The results are illustrated in FIG. 3. A continuous refractive index distribution in which the maximum value was about 0.095 was measured in a circular area having a diameter of about 20 mm.

Figure 4:
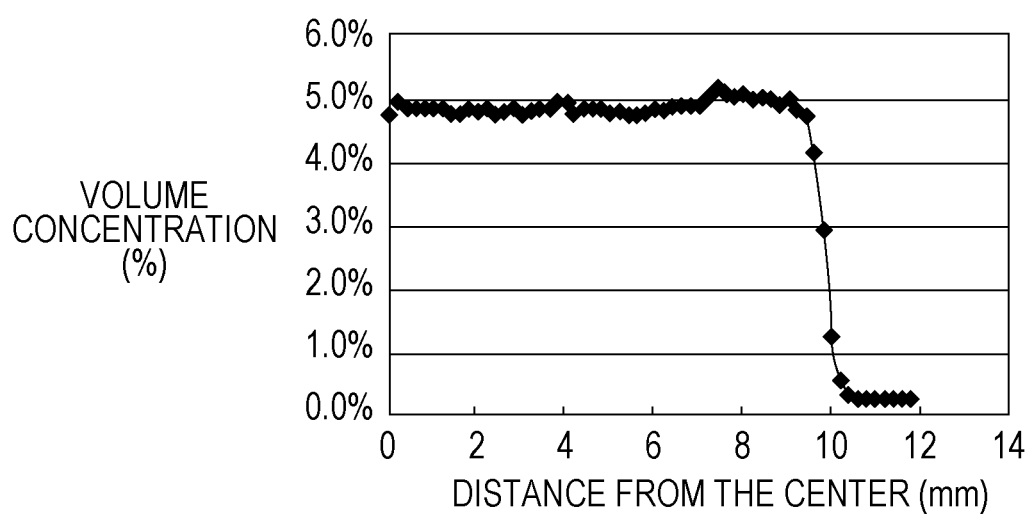
FIG. 4 illustrates a volume concentration distribution of zirconium oxide particles in a lens obtained in EXAMPLE 1.

A composition distribution in the irradiation surface of the cured product was observed with an energy dispersive micro x-ray fluorescence spectrometer μEDX-1300 (manufactured by SHIMADZU CORPORATION) with which ultimate analysis of a 50 μm diameter area can be performed. Specifically, the intensity of the peak of a fluorescent X-ray (15.85 keV) derived from zirconium atoms was mapped at an interval of 0.2 mm. The results are illustrated in FIG. 4.

The volume concentration of zirconium atoms, that is, the volume concentration of the zirconium oxide particles (e), is within ±10% of the average volume concentration of the particles in a circular area having a diameter of about 20 mm. Thus, it has been confirmed that the zirconium oxide particles (e) are uniformly dispersed.

EXAMPLE 1 has demonstrated that, by a method for producing a gradient-index plastic lens according to the present invention, a gradient-index plastic lens according to the present invention can be produced with simple equipment, through a small number of steps, and in a short time.

Example 2

Casting cells filled with the radiation polymerizable composition (A)-3 were prepared as in EXAMPLE 1.

A 50 mm diameter photomask having a 20 mm diameter circular transparent portion in the central portion thereof was prepared as in EXAMPLE 1. Then, the radiation polymerizable composition (A)-3 was exposed to ultraviolet rays with different exposure times as described below.

Measurement Example 2-1

The photomask was placed on the central portion of the casting cell. The casting cell was irradiated for 25 seconds with a light source and an optical system as in EXAMPLE 1 through the photomask at an illuminance of 30 mW/cm$^2$.

Measurement Example 2-2

The photomask was placed on the central portion of the casting cell. The casting cell was irradiated for 40 seconds with a light source and an optical system as in EXAMPLE 1 through the photomask at an illuminance of 30 mW/cm$^2$.

Measurement Example 2-3

The photomask was placed on the central portion of the casting cell. The casting cell was irradiated for 150 seconds with a light source and an optical system as in EXAMPLE 1 through the photomask at an illuminance of 30 mW/cm$^2$.

Measurement Example 2-4

The photomask was placed on the central portion of the casting cell. The casting cell was irradiated for 200 seconds with a light source and an optical system as in EXAMPLE 1 through the photomask at an illuminance of 30 mW/cm$^2$.

The uncured portions of the radiation polymerizable composition (A)-3 were extracted from the casting cells in MEASUREMENT EXAMPLES 2-1 to 2-4 as in EXAMPLE 1. The gel in the casting cell in MEASUREMENT EXAMPLE 2-1 collapsed.

The radiation polymerizable composition (B)-3 was rapidly injected into the casting cells in MEASUREMENT EXAMPLES 2-2 to 2-4 as in EXAMPLE 1.

The casting cells in MEASUREMENT EXAMPLES 2-2 to 2-4 were left at room temperature for 4 hours as in EXAMPLE 1.

The whole surfaces of the casting cells in MEASUREMENT EXAMPLES 2-2 to 2-4 were irradiated with ultraviolet rays for an hour as in EXAMPLE 1. Then, the optical glass plates were disassembled and flat-plate cured products were obtained.

Figure 6:
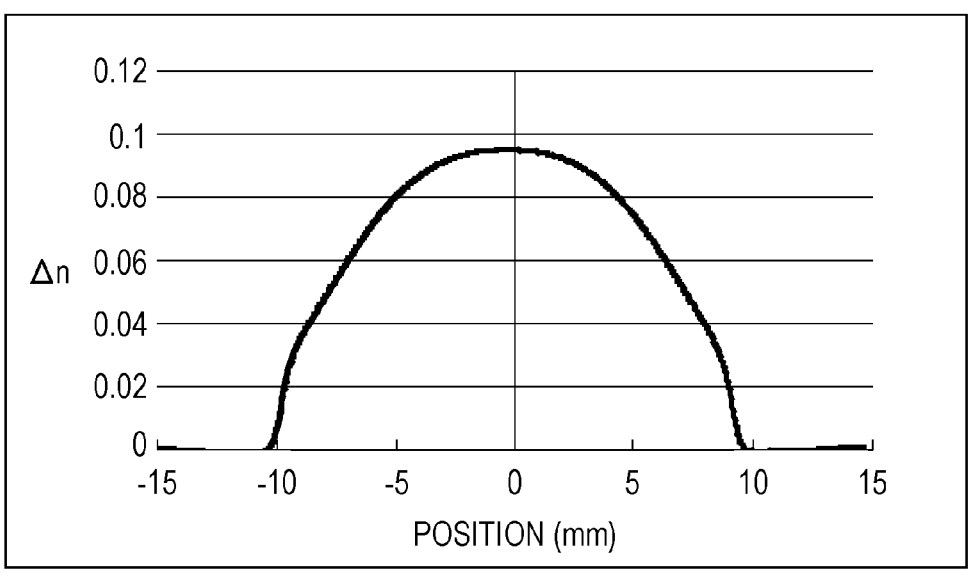
FIG. 6 illustrates a refractive index distribution of a cured product obtained in MEASUREMENT EXAMPLE 2-2.
Figure 7:
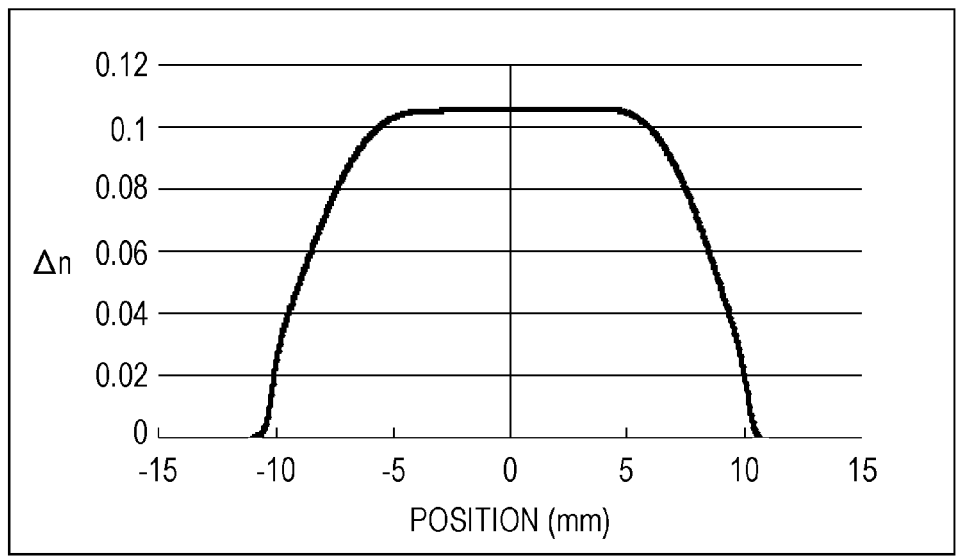
FIG. 7 illustrates a refractive index distribution of a cured product obtained in MEASUREMENT EXAMPLE 2-3.
Figure 8:
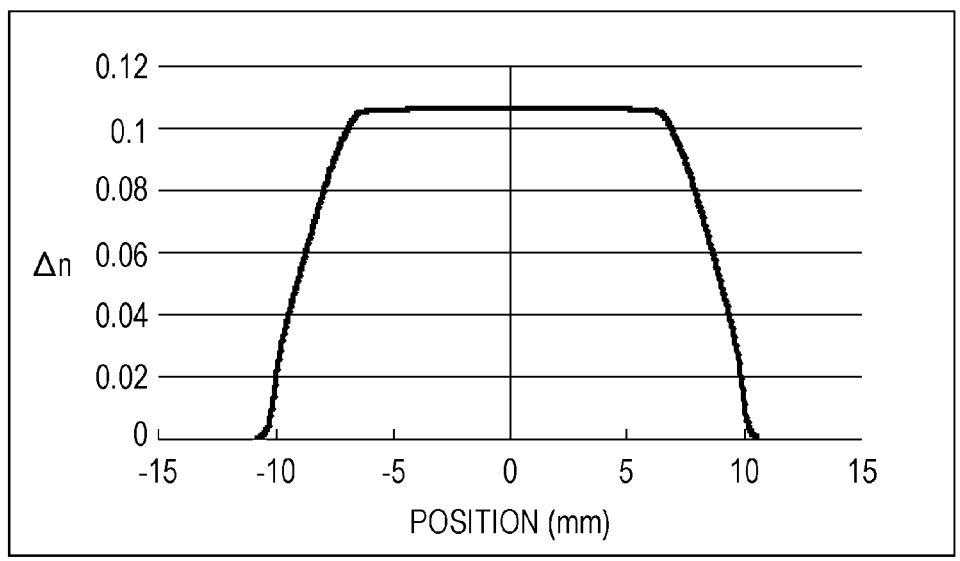
FIG. 8 illustrates a refractive index distribution of a cured product obtained in MEASUREMENT EXAMPLE 2-4.

The cured products in MEASUREMENT EXAMPLES 2-2 to 2-4 were evaluated in terms of refractive index distribution at a wavelength of 524.3 nm as in EXAMPLE 1. The results are illustrated in FIGS. 6 to 8. The results show that, the longer the exposure time is, the more flat the refractive index distribution profile of the sample central portion becomes. Accordingly, the longer the exposure time is, the slower the diffusion in the gel proceeds.

Figure 9:
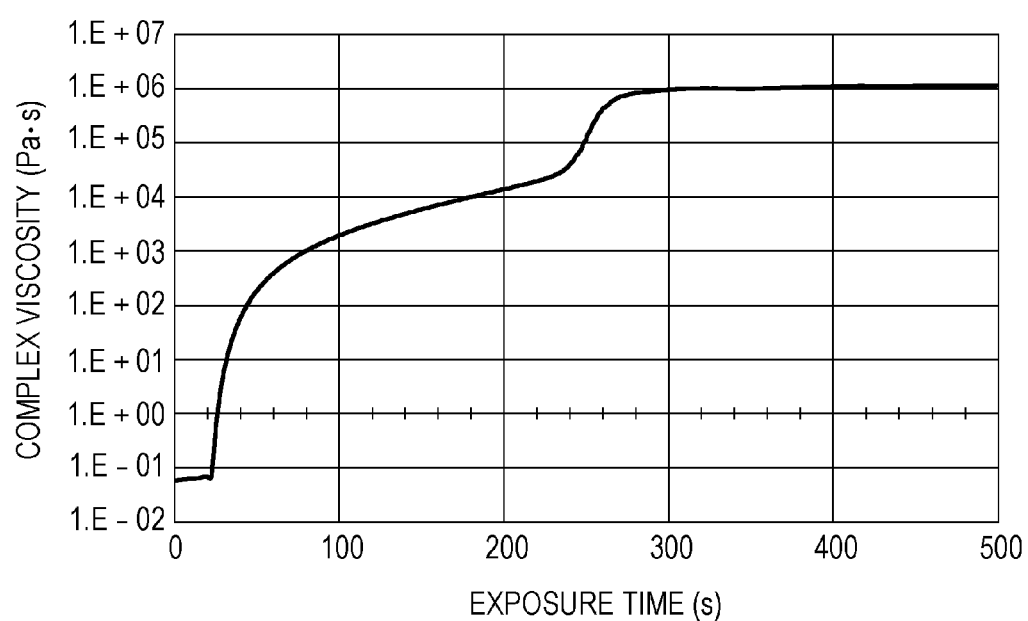
FIG. 9 illustrates the relationship between exposure time and complex viscosity obtained in EXAMPLE 2.

The relationship between exposure time of the radiation polymerizable composition (A)-3 to ultraviolet rays and complex viscosity of the radiation polymerizable composition (A)-3 having been exposed to ultraviolet rays was examined with a dynamic viscoelasticity measurement apparatus having an ultraviolet-ray radiation mechanism (MCR-301 manufactured by Anton Paar Japan K.K.). The ultraviolet rays were radiated at an illuminance of 30 mW/cm$^2$ in terms of a wavelength of 365 nm. The relationship between exposure time and complex viscosity is illustrated in FIG. 9.

Summary

In MEASUREMENT EXAMPLE 2-1 where the exposure time was 25 seconds, the complex viscosity was 0.4 Pa·s.

In MEASUREMENT EXAMPLE 2-2 where the exposure time was 40 seconds, the complex viscosity was 56 Pa·s.

In MEASUREMENT EXAMPLE 2-3 where the exposure time was 150 seconds, the complex viscosity was 5,840 Pa·s.

In MEASUREMENT EXAMPLE 2-4 where the exposure time was 200 seconds, the complex viscosity was 14,000 Pa·s. It has been found that the cured product obtained in MEASUREMENT EXAMPLE 2-4 has such a high complex viscosity and hence the diffusion slowly proceeds and the cured product does not have a refractive index distribution required for a lens. It has been found that each cured product obtained in MEASUREMENT EXAMPLES 2-2 and 2-3 has such an appropriate complex viscosity and hence the diffusion sufficiently rapidly proceeds and the cured product has a refractive index distribution required for a lens.

It has been found that the gel in MEASUREMENT EXAMPLE 2-1 collapsed because the complex viscosity was too low.

It has been found that why, in MEASUREMENT EXAMPLES 2-2 to 2-4, the longer the exposure time, the slower the diffusion proceeds: the longer the exposure time, the higher the complex viscosity is.

Reference Example 3

In REFERENCE EXAMPLE 3, plastic cured products having model compositions corresponding to gradient-index plastic lenses in which refractive index distributions were formed by particle concentration distributions, were produced and measured in terms of thermal expansion coefficient as in REFERENCE EXAMPLE 1.

A radiation polymerizable composition (C)-1 was prepared that was composed of 50 parts by weight of benzyl methacrylate (manufactured by Kyoeisha Chemical Co., Ltd.), 50 parts by weight of zirconium oxide particles having an average diameter of 7 nm (manufactured by Sumitomo Osaka Cement Co., Ltd.), and 0.1 parts by weight of a photosensitive radical generator (IRGACURE 184 manufactured by Ciba Japan K. K.).

A radiation polymerizable composition (C)-2 was prepared that was composed of 60 parts by weight of benzyl methacrylate (manufactured by Kyoeisha Chemical Co., Ltd.), 40 parts by weight of zirconium oxide particles having an average diameter of 7 nm (manufactured by Sumitomo Osaka Cement Co., Ltd.), and 0.1 parts by weight of a photosensitive radical generator (IRGACURE 184 manufactured by Ciba Japan K. K.).

A radiation polymerizable composition (C)-3 was prepared that was composed of 75 parts by weight of benzyl methacrylate (manufactured by Kyoeisha Chemical Co., Ltd.), 25 parts by weight of zirconium oxide particles having an average diameter of 7 nm (manufactured by Sumitomo Osaka Cement Co., Ltd.), and 0.1 parts by weight of a photosensitive radical generator (IRGACURE 184 manufactured by Ciba Japan K. K.).

A radiation polymerizable composition (C)-4 was prepared that was composed of 100 parts by weight of benzyl methacrylate (manufactured by Kyoeisha Chemical Co., Ltd.) and 0.1 parts by weight of a photosensitive radical generator (IRGACURE 184 manufactured by Ciba Japan K. K.).

Flat-plate cured products formed from the radiation polymerizable compositions (C)-1 to (C)-4 were produced as in REFERENCE EXAMPLE 1.

The flat-plate cured products formed from the radiation polymerizable compositions (C)-1 to (C)-4 were measured in terms of thermal expansion coefficient in the range of 0° C. to 40° C. as in REFERENCE EXAMPLE 1; as a result, the thermal expansion coefficients were respectively found to be 53, 54, 58, and 71 ppm/° C.

Accordingly, it has been demonstrated that, when radiation polymerizable compositions have different weight proportions of the particles (e), difference in thermal expansion coefficient between these compositions is large.

Reference Example 4

In REFERENCE EXAMPLE 4, plastic cured products having model compositions corresponding to gradient-index plastic lenses in which refractive index distributions were formed by three-dimensional copolymerization composition proportion distributions of organic polymer components and no particles were contained, were produced and measured in terms of thermal expansion coefficient as in REFERENCE EXAMPLE 1.

A radiation polymerizable composition (C)-5 was prepared that was composed of 90 parts by weight of benzyl methacrylate (manufactured by Kyoeisha Chemical Co., Ltd.), 10 parts by weight of trimethylolpropane triacrylate (manufactured by Sigma-Aldrich Japan K.K.), and 0.1 parts by weight of a photosensitive radical generator (IRGACURE 184 manufactured by Ciba Japan K. K.).

A radiation polymerizable composition (C)-6 was prepared that was composed of 90 parts by weight of methyl methacrylate (manufactured by Sigma-Aldrich Japan K.K.), and 10 parts by weight of trimethylolpropane triacrylate (manufactured by Sigma-Aldrich Japan K.K.), and 0.1 parts by weight of a photosensitive radical generator (IRGACURE 184 manufactured by Ciba Japan K. K.).

Flat-plate cured products formed from the radiation polymerizable compositions (C)-5 and (C)-6 were produced as in REFERENCE EXAMPLE 1.

The flat-plate cured products formed from the radiation polymerizable compositions (C)-5 and (C)-6 were measured in terms of thermal expansion coefficient in the range of 0° C. to 40° C. as in REFERENCE EXAMPLE 1; as a result, the thermal expansion coefficients were respectively found to be 68 and 66 ppm/° C. Compared with plastic lenses containing the particles in REFERENCE EXAMPLES 1 and 2, the thermal expansion coefficients were large.

Figure 5:
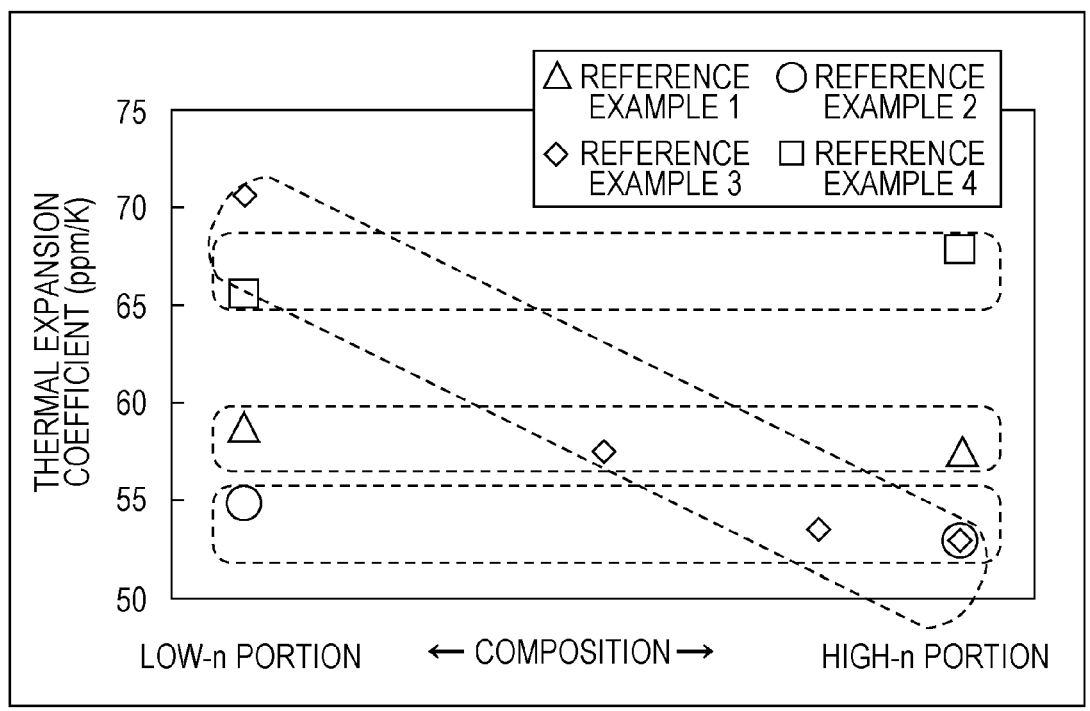
FIG. 5 is a graph illustrating the thermal expansion coefficients of cured products obtained in REFERENCE EXAMPLES 1 to 4.

The results from REFERENCE EXAMPLES 1 to 4 are summarized in a graph in FIG. 5.

The present invention can be applied to various optical systems such as cameras, optical-fiber image-forming systems, copiers, and pickup optical systems for compact discs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-086188 filed Apr. 2, 2010, which is hereby incorporated by reference herein in its entirety.

What is claimed is:

1. A lens comprising:
   a mixture of polymers including a polymer formed from first organic monomers and a polymer formed from second organic monomers whose refractive index is different from a refractive index of the polymer formed from the first organic monomers, and
   particles,
   wherein a concentration of the polymer formed from the first organic monomers in the lens decreases along a direction from a center of the lens toward a rim of the lens,
   wherein a concentration of the polymer formed from the second organic monomers in the lens increases along the direction,
   wherein a thermal expansion coefficient of the particles is smaller than a thermal expansion coefficient of the mixture of the polymers, and
   wherein the particles are uniformly dispersed in the lens.

2. The lens according to claim 1, wherein a volume concentration of the particles in a region having dimensions of 0.2 mm×0.2 mm×0.2 mm selected from any position of the lens is within ±10% of an average volume concentration of the particles in the lens.

3. The lens according to claim 1, wherein a thermal expansion coefficient of the polymer of the first organic monomers is larger than a thermal expansion coefficient of the polymer of the second organic monomers.

4. The lens according to claim 1, wherein a refractive index of the lens decreases in the direction from the center of the lens toward the rim of the lens.

5. The lens according to claim 1, wherein both the polymer formed from the first organic monomers and the polymer formed from the second organic monomers are polymers formed from radical polymerizable monomers.

6. The lens according to claim 1, wherein both the polymer formed from the first organic monomers and the polymer formed from the second organic monomers are polymers formed from monomers each having one or more (meth) acryloyl groups.

7. The lens according to claim 1, wherein the mixture of the polymers is a mixture of benzyl methacrylate, tetrafluoropropyl methacrylate, methyl methacrylate, and trimethylolpropane triacrylate.

* * * * *